(12) United States Patent
Deen et al.

(10) Patent No.: US 12,080,047 B2
(45) Date of Patent: Sep. 3, 2024

(54) ARTIFICIAL INTELLIGENCE-ASSISTED CONTENT SOURCE IDENTIFICATION

(71) Applicant: NBCUniversal Media, LLC, New York, NY (US)

(72) Inventors: Robert Glenn Deen, Simi Valley, CA (US); Michael Shane Wilkinson, Newhall, CA (US); Eric J. Avila, Los Angeles, CA (US); Borzou Afshar, Los Angeles, CA (US)

(73) Assignee: NBCUniversal Media, LLC, New York, NY (US)

( * ) Notice: Subject to any disclaimer, the term of this patent is extended or adjusted under 35 U.S.C. 154(b) by 827 days.

(21) Appl. No.: 16/657,286

(22) Filed: Oct. 18, 2019

(65) Prior Publication Data

US 2021/0117480 A1 Apr. 22, 2021

(51) Int. Cl.
*G06V 10/764* (2022.01)
*G06F 16/903* (2019.01)
*G06N 3/045* (2023.01)
*G06N 3/08* (2023.01)
*G06V 10/82* (2022.01)
*G06V 20/40* (2022.01)

(52) U.S. Cl.
CPC ...... *G06V 10/764* (2022.01); *G06F 16/90335* (2019.01); *G06N 3/045* (2023.01); *G06N 3/08* (2013.01); *G06V 10/82* (2022.01); *G06V 20/48* (2022.01)

(58) Field of Classification Search
CPC .. G06F 16/90335; G06N 3/0454; G06N 3/08; G06V 10/82; G06V 20/48; G06K 9/6267
See application file for complete search history.

(56) References Cited

U.S. PATENT DOCUMENTS

2008/0019560 A1* 1/2008 Rhoads .............. H04N 1/32352
382/100
2010/0189183 A1* 7/2010 Gu .................. H04N 21/23439
375/E7.154

(Continued)

OTHER PUBLICATIONS

Stolikj et al., Artificial Intelligence for Detecting Media Piracy, SMPTE Motion Imaging Journal, Jul. 2018, p. 22-27, retrieved on Jul. 6, 2022, retrieved from the Internet <URL: https://ieeexplore.ieee.org/abstract/document/8395449> (Year: 2018).*

(Continued)

*Primary Examiner* — Tyler J Torgrimson

(74) *Attorney, Agent, or Firm* — Fletcher Yoder, P.C.

(57) ABSTRACT

A tangible, non-transitory machine-readable medium includes machine readable instructions that, when executed by processing circuitry, cause the processing circuitry to receive an inquiry regarding digital content. The inquiry is indicative of a request for the digital content or a request for a determination to be made regarding the digital content. The instructions, when executed, also cause the processing circuitry to process the inquiry by analyzing aggregated result data generated using a series of neural network layers based on the digital content and metadata associated with the digital content. Furthermore, the instructions, when executed, cause the processing circuitry to generate response data to the inquiry using a neural network based on analyzing the aggregated result data.

20 Claims, 4 Drawing Sheets

(56) References Cited

U.S. PATENT DOCUMENTS

| | | | | |
|---|---|---|---|---|
| 2013/0182073 A1* | 7/2013 | Yin | ...................... | H04N 19/597 |
| | | | | 348/43 |
| 2018/0232508 A1* | 8/2018 | Kursun | .................. | G06N 3/045 |
| 2018/0247054 A1* | 8/2018 | Porat | ........................ | G06N 3/08 |

OTHER PUBLICATIONS

Jing Li, Huaxiang Zhang, Wenbo Wan and Jiande Sun, "Two-class 3D-CNN classifiers combination for video copy detection" Multimedia Tools and Applications, Kluwer Academic Publishers, Boston, US, vol. 79, No. 7-8, May 4, 2018, pp. 4749-4761.

Yu-Gang Jiang and Jiajun Wang, "Partial Copy Detection in Videos: a Benchmark and an Evaluation of Popular Methods", IEEE Transactions on Big Data, IEEE, vol. 2, No. 1, Mar. 1, 2016, pp. 32-42.

Extended European Search Report for Appl. No. 20193481.7 dated Feb. 22, 2021 (8 pages).

European First Examination Report (Office Action) for EP Application No. 20 193 487.7 dated Feb. 1, 2023, 6 pgs.

* cited by examiner

ARTIFICIAL INTELLIGENCE-ASSISTED CONTENT SOURCE IDENTIFICATION

BACKGROUND

The present disclosure relates generally to the digital content identification techniques. More particularly, the present disclosure relates to identifying the source of digital content, such as video or image data, using artificial intelligence (AI).

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Digital content can be disseminated using various techniques, such as television broadcasting, cable (e.g., distributing content via television cable), satellite (e.g., distributing content via a direct-broadcast satellite), and webcasting (e.g., distributing content via the internet). The content may be broadcasted by various sources. For example, a company that creates or licenses television programming may provide such content for viewers to watch. As another example, illegitimately-obtained or illegally-obtained content (e.g., pirated content) may be disseminated.

Distributed content may include characteristics that are unique to the source of the content, provide possible indications as to the source of the content, or potentially indicate whether content is pirated or originated from the same source as other content. It may be useful to utilize such characteristics to determine the source of digital content or to determine whether content is pirated.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

The current embodiments relate to techniques for classifying content (e.g., broadcast content or other video or audiovisual content) and making determinations about the content, such as a source of the content. For instance, embodiments of the present application relate to a content source identification system that may use artificial intelligence and/or machine learning techniques to recognize correlations or patterns in content as well as metadata associated with the content. For example, content may include encoded video content that has metadata associated with the encoding of underlying video data. Machine learning techniques may be utilized to determine patterns or other information about the content. As also discussed herein, the content source identification system may process inquiries regarding content. For example, in response to receiving a request to identify a source of particular content, the content source identification system may analyze the content and determine the source of the content based on, for instance, metadata included in the content.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As set forth above, content (e.g., video or audio content) may be distributed in a number of ways. In some cases, content may be illegally distributed. For example, pirated content (e.g., illegally-obtained content) or legitimately-obtained content may be disseminated (e.g., broadcasted, provided via the interne, or otherwise made available). In many cases, the content may be encoded according to an encoding standard. Encoded content may include metadata that provides information about the content and, among other things, how the content was encoded. As discussed below, a content source identification system may analyze content and determine a source of the content, for example, to enable action to be taken to stop illegal or undesirable content distribution. For instance, the content source identification system may receive recorded content (e.g., a video uploaded to a website) or content that is being broadcasted or disseminated live or near-live (e.g., content being broadcasted or webcasted). The content source identification system may employ techniques to recognize characteristics or patterns in content, including receiving content. For example, as discussed below, the content source identification system may utilize artificial intelligence to make various determinations about the content being analyzed, such as a source of the content.

Figure 1:
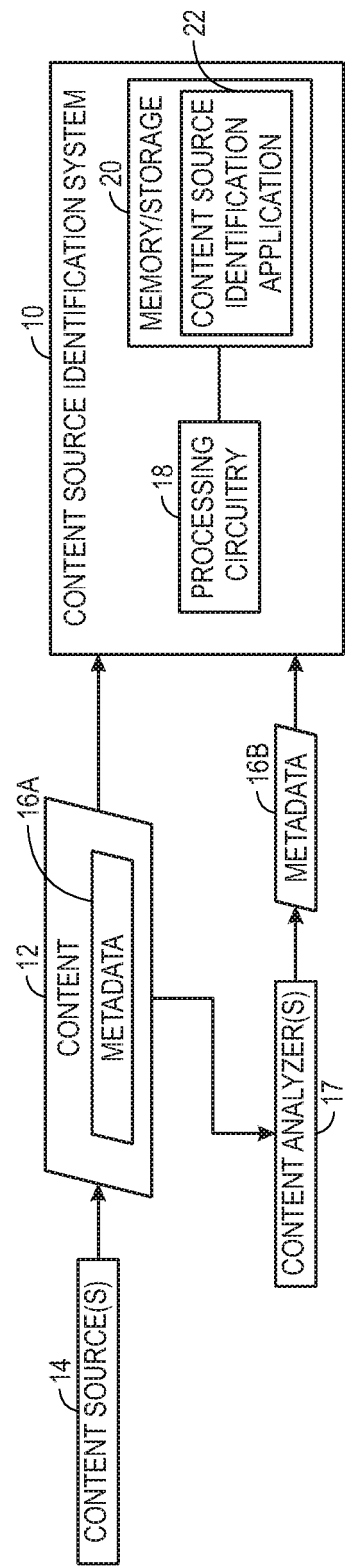
FIG. 1 illustrates a content source identification system that may receive content from one or more content sources, in accordance with an embodiment of the present disclosure.

With the foregoing in mind, FIG. 1 illustrates a content source identification system 10 that may receive content 12 from one or more content sources 14. The content 12 may include media content such as audio content (e.g., music), video (e.g., movies, television shows, video recordings), and/or other forms of media content. The content 12 may also include metadata 16A that provides information about the content 12. Additionally, the content source identification system 10 may receive metadata 16B from one or more content analyzers 17 that may receive the content 12, analyze the content 12, and generate the metadata 16B. The metadata 16A, 16B, as discussed below, may indicate how the content 12 was encoded as well as encoding parameters utilized when the content 12 was encoded. The metadata 16A, 16B may also provide other information about the content 12, such as a title of the content 12 or people or entities involved in the creation of the content 12 (e.g., directors, producers, actors, studios, companies, production and filming staff or crew members, etc.)

The content source(s) 14 may include a device that records the content 12 or distributes or otherwise makes available the content 12. For example, one content source 14 may be a camera that is utilized to record broadcasted content (e.g., television programming). As another example, another content source 14 may be an electronic device that broadcasts or webcasts (e.g., broadcasts via the internet) the content 12. In some cases, the content source(s) 14 may have illegally obtained the content 12, may have illegally distributed the content 12, or may be illegally distributing the content 12. As discussed herein, the content source identification system 10 may analyze the content 12 to determine the content source(s) 14.

The content analyzers 17 may be computing devices that include processing circuitry and storage media that include instructions that enable the processing circuitry of the content analyzers 17 to analyze the content 12. In particular, the content analyzers 17 may analyze the content 12 to generate the metadata 16B that may differ from the metadata 16A and not be included in the content 12. As an example, in one embodiment, the metadata 16A may include information about the content 12 such as a title of the content 12 or people or entities involved in the creation of the content 12, whereas the metadata 16B may include information indicating how the content 12 was encoded as well as encoding parameters utilized when the content 12 was encoded. The content source identification system 10 may analyze the metadata 16B to determine the content source(s) 14.

The content source identification system 10 may include processing circuitry 18 and memory/storage 20. The processing circuitry 18 may carry out a variety of operations of the content source identification system 10, such as receiving the content 12 and identifying a source of the content 12 (e.g., one or more of the content sources 14). The processing circuitry 18 may include any suitable data processing circuitry to perform these operations, such as one or more microprocessors, one or more application specific processors (ASICs), or one or more programmable logic devices (PLDs). In some cases, the processing circuitry 18 may execute programs or instructions (e.g., an application program) stored on a suitable article of manufacture, such as the memory/storage 20. In addition to instructions for the processing circuitry 18, the memory/storage 20 may also store data to be processed by the processing circuitry 18.

Figure 2:
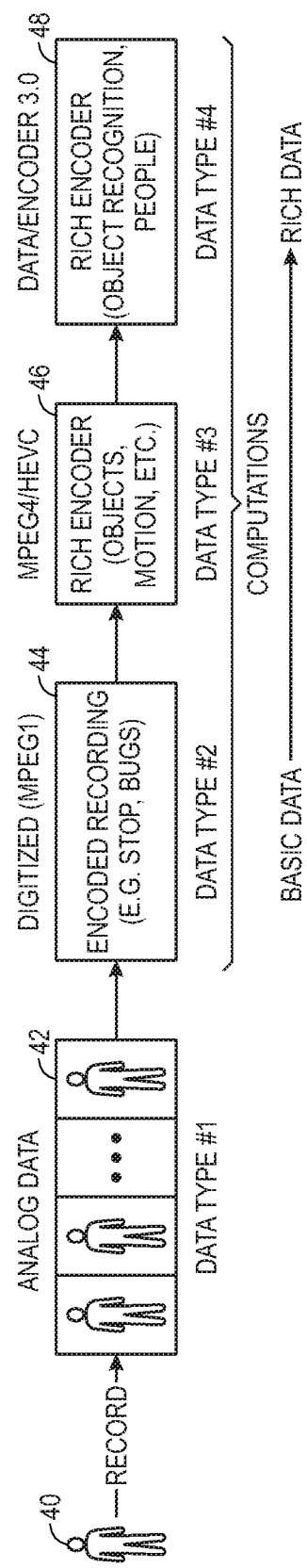
FIG. 2 illustrates a progression from generating or capturing content to several stages of encoding the content for storage and distribution, in accordance with an embodiment of the present disclosure.

By way of example, the memory/storage 20 may include random access memory (RAM), read only memory (ROM), rewritable non-volatile memory such as flash memory, hard drives, optical discs, or a combination thereof. In other words, the memory/storage 20 may include volatile memory as well as non-volatile memory. In particular, the memory/storage 20 may include a content source recognition application 22, which may be stored on non-volatile memory of the memory/storage 20. The content source recognition application 22 may include instructions that, when executed, cause the processing circuitry 18 to perform various operations including, but not limited to, receiving the content 12, analyzing the content 12, and making determinations about the content 12. For example, as discussed below, the determinations that the processing circuitry 18 may make by executing the content source recognition application 22 may include determining patterns or correlations in the content 12 (e.g., about the content 12 itself or relative to other content such as previously analyzed content) as well as determining a content source 14 of the content 12. Additionally, it should be noted that the content analyzers 17 may be included in the content source identification system 10. For example, the content source identification application 22 may include instructions that the processing circuitry 18 may execute in order to analyze the content 12 and As mentioned above, the content source identification system 10 may analyze the content 12 and the metadata 16A, 16B included in or associated with the content 12. To help provide more context into the content 12, the metadata 16A that may be included with the content 12, and the metadata 16B generated by the content analyzers 17, FIG. 2 is provided. In particular, FIG. 2 illustrates a progression from generating or capturing content to several stages of encoding the content for storage and distribution. For instance, the various types of data illustrated in FIG. 2 may be included in the content 12, and metadata associated with these types of data may be included in the metadata 16A, 16B.

A person 40 (or an object) may be captured by recording equipment (e.g., a camera) on analog film to generate a first type of data 42. For example, the analog film may include several frames of image data that include the person 40. The device utilized to generate the first type of data 42 may operate according to various settings (aperture, shutter speed) of the device, and the first type of data 42 may include various artifacts that are transferred onto the analog film as a result of using that particular device to record the person 40.

The first type of data 42 may be encoded, for instance, using encoding software executed by a processor. As discussed herein, various encoding techniques or software may be utilized to encode captured content. While examples of encoding standards are provided below, it should be noted that the techniques discussed herein are not limited the particular standards discussed. Rather, the standards discussed below are provided as examples of standards that may provide differing amounts of information about content. For instance, some standards may have different levels of data compression, and content generating using one standard may include different amounts and/or types of metadata about the content.

With this in mind, the first type of data 42 may be encoded according to a standard such as Moving Picture Experts Group Phase 1 (MPEG-1) as described in International Organization for Standardization (ISO)/International Electrotechnical Commission (IEC) Standard 11172 entitled "Information technology—Coding of moving pictures and associated audio for digital storage media at up to about 1,5 Mbit/s" or other MPEG standards (e.g., MPEG-2). In other words, the first type of data 42 may be compressed using an encoding standard to generate a second type of data 44, which may be a digitized form of content initially captured on analog film. It should be noted that, in some cases, the person 40 may initially be captured in a digital format (e.g., using a digital camera). In such a case, the first type of data 42 may not be generated.

The second type of data 44 may include more and different metadata regarding content as compared to analog film. For example, the second type of data 44 may include metadata related to camera settings (e.g., f-stops) used to record the content. Additionally, the second type of data 44 may include pixel imperfections or artifacts that are generated when encoding the content. It should also be noted that any optical artifacts that the device (e.g., camera) initially used to capture the content may also be incorporated into the second type of data 44. As discussed below, the metadata in the second type of data 44 may be utilized to determine a content source.

The content can be further compressed (or initially compressed) using relatively more advanced techniques, such as MPEG-4 as described in ISO/IEC 14496 entitled "Coding of audio-visual objects" or High Efficiency Video Coding (HEVC) as described in International Telecommunication Union standard H.265 entitled "High efficiency video coding." Such content may be a third type of data 46. Encoding content using the MPEG-4 and HEVC standards may provide "richer" data compared to other standards, such as MPEG-1 or MPEG-2. That is, MPEG-4 content and HVEC content may include metadata discussed above as well as additional metadata regarding the content. For example, MPEG-4 encoding and HEVC encoding compress data, in part, based on recognizing objects captured in the content. For example, object motion between frames of content may be calculated, which enables data to be further compressed because a difference value (e.g., a motion vector) indicating how much a particular object has moved from frame to frame may be stored and transmitted in comparison to transmitting data for an entire frame of content. In other words, MPEG-4 content and HEVC content may include metadata that represents the changes from one from of the content to another frame of the content. Other metadata that describes the content may include which software was utilized to generate the content, a time and date that the content was generated, a duration of the content, and various encoding parameters such as maximum and minimum group of pictures size (e.g., number of frames that reference each other), settings related to different types of frames (e.g., I-frames, P-frames, and B-frames), color settings, frame packing settings, number of slices per frame, minimum and maximum sizes of slices, timing information, quantization parameter settings, an average bitrate of the content, a minimum and/or maximum bitrate of the content, quantization factors or differences between types of image frames, settings related to motion estimation (e.g., a motion vector prediction mode, weighted predictions for types of image frames, a maximum motion vector length and search range). The metadata may also include information about an author of the content (e.g., the person who caused the MPEG-4 content or HEVC content to be generated) or information that describes the content (e.g., a title of the content, an image associated with the content, a language of the content). As discussed below, metadata, such as the aforementioned examples, and any metadata that indicates encoding parameters used when generating the third type of data 46 may be utilized to determine a content source.

Continuing with the discussion of FIG. 2, the content may be further compressed (or initially compressed) using relatively more advanced techniques, which are represented by "Data/Encoder 3.0" in FIG. 2. An example of such a technique may be a combination of MPEG-4 (e.g., to encode video and audio data) and MPEG-7 (e.g., to provide metadata about content included in the encoded audio or video data). These more advanced techniques may produce a fourth type of data 48, which may include the metadata discussed above as well as additional metadata. For example, metadata included with the fourth type of data 48 may also include metadata that identifies one or more objects and/or people included in the content, which frames of the content such objects or people may be found in, the position of such objects or people in each frame, and other information related to such objects or people (e.g., brightness or color information associated with the objects or people, a name of an object or person). Similar to the second type of data 44 and third type of data 46, metadata included with in the fourth type of data 48 may be utilized to determine a content source.

In some cases, the content 12 may not include some of the types of metadata discussed above with respect to the first type of data 42, the second type of data 44, the third type of data 46, or the fourth type of data 48. In other words, in some embodiments, these types of metadata may not be included in the metadata 16A that is included in the content 12. Rather, in such a case, the metadata 16B may include such metadata. For example, the content analyzers 17 may analyze the content 12 (e.g., first type of data 42, the second type of data 44, the third type of data 46, or the fourth type of data 48) to generate the metadata 16B regarding the content 12.

Figure 3:
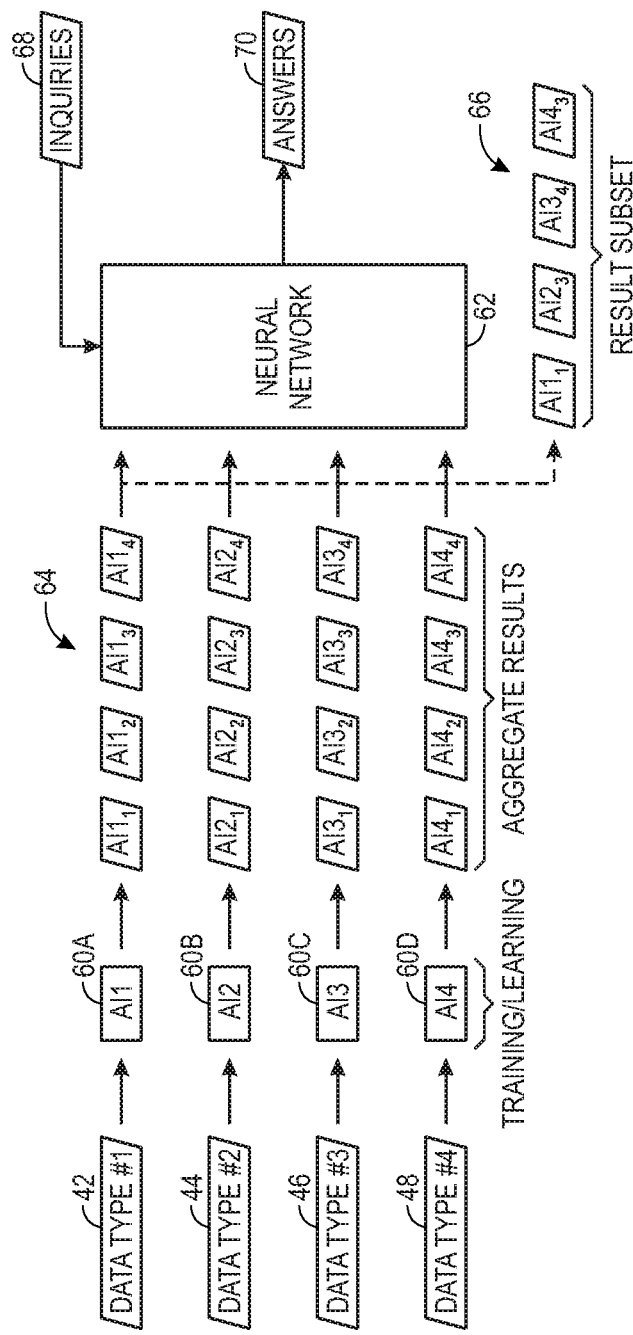
FIG. 3 illustrates artificial intelligence engines and a neural network that may be implemented using the content source identification system of FIG. 1, in accordance with an embodiment of the present disclosure.

As noted above, the content source identification system 10 may utilize artificial intelligence or machine learning techniques to analyze content (e.g., content 12), metadata included with content (e.g., metadata 16A), and metadata degenerated from the content (e.g., metadata 16B) to make determinations about the content, such as a source of the content (e.g., a content source 14). Bearing this in mind, FIG. 3 illustrates how the content source identification system 10 may use artificial intelligence to make determinations about the content 12. In particular, FIG. 3 includes artificial intelligence engines 60A-60D and a neural network 62, each of which may be implemented using the processing circuitry 18 (e.g., by executing the content source identification application 22). In an aspect, each artificial intelligence engine 60A-60D may include one or more layers of a neural network configured to receive a designated data type and to output information or observations regarding the data type.

The artificial intelligence engines 60A-60D may each receive a different type of data, such as a different form or data type of content 12, and analyze the data. For example, a first artificial intelligence engine 60A may receive and analyze the first type of data 42, a second artificial intelligence engine 60B may receive and analyze the second type of data 44, a third artificial intelligence engine 60C may receive and analyze the third type of data 46, and a fourth artificial intelligence engine 60D may receive and analyze the fourth type of data 48. Based on the types of data, the artificial intelligence engines 60A-60D may generate data (e.g., aggregate result data 64) that describes characteristics of content at varying levels of abstraction corresponding to the types of data 42, 44, 46, 48 (e.g., at an analog or film level, at an MPEG-1 level, at an MPEG-4/HEVC level, and at a data/encoder 3.0 level). In other words, a piece of content may be decomposed into several elements and different types of metadata (e.g., that are associated with one of more of the types of data 42, 44, 46, 48), and each element of piece of metadata can be analyzed by one or more of the artificial intelligence engines 60A-60D. For example, the first type of data 42 may include optical artifacts related to a camera utilized to capture content. The second type of data 44 (and third type of data 46 and fourth type of data 48) may include first order inference information (e.g., as metadata), such as a compression algorithm or setting information associated with the content. The artificial intelligence engines 60A-60D may generate the aggregate result data 64 or a portion thereof by analyzing the types of data 42, 44, 46, 48. It should be noted that the aggregate result data 64 may include first order inference information that is generated by the artificial intelligence engines 60A-60D. Furthermore, in some cases, human feedback may be used to train the artificial intelligence engines 60A-60D to ensure that the artificial intelligence engines 60A-60D provide correct data (e.g., in the aggregate result data 64).

The aggregate results data 64 generated by the artificial intelligence engines 60A-60D may also include secondary and tertiary inference data. For example, the artificial intelligence engines 60A-60D may learn to recognize particular encoding algorithms or encoding settings by observing encoding artifacts that appear in the encoded data or decoded data. In other words, the artificial intelligence engines 60A-60D may be trained to make inferences based on content being analyzed as well as other inferences made by the artificial intelligence engines 60A-60D. As an example, by analyzing the types of data 42, 44, 46, 48 (e.g., included in content 12), the artificial intelligence engines 60A-60D may determine a compression algorithm (e.g., particular software) and compression settings used to encode the content 12 based on the content 12 and the metadata 16A, 16B. Based on the determined compression algorithm and compression settings, the artificial intelligence engines 60A-60D may identify a particular model of camera that was used to capture the content 12. In this example, the compression algorithm and compression settings would be a primary inference, and the particular model of camera would be a secondary inference. An example of a tertiary inference would be the artificial intelligence engines 60A-60D determining that a person (e.g., a user of a web site) or device (e.g., associated with a particular identifier such as an IP address) has a history or posting similar content, content with similar artifacts, uses the identified type of camera, or a combination thereof. For example, the memory/storage 20 may include a database or library that stores data related to previously analyzed content, and the artificial intelligence engines 60A-60D may determine that content being analyzed was captured or distributed by the same content source 14 based on a comparison of characteristics of the content to data included in the database. As another example, content being analyzed may be compared against other available content, such as other content that is being broadcasted, webcasted, or otherwise disseminated or made available. In such examples, the series or sequence of artificial intelligence engines 60A-60D may identify transmission parameters (e.g., bitrates, burst patterns, whether fixed versus variable bit rate transmission is employed) used for transmitting the content in order to help identify patterns.

Each of the artificial intelligence engines 60A-60D may be trained to make particular inferences. For example, the second artificial intelligence engine 60B may be trained to determine a particular encoder (e.g., encoding algorithm) used to encode content being analyzed. Another of the artificial intelligence engines 60A-60D may be trained to determine one or more particular encoding settings associated with content. In other words, while four artificial intelligence engines 60A-60D are included in the FIG. 3, in other embodiments, fewer or more than four artificial intelligence engines 60 may be included. For instance, an artificial intelligence engine 60 may be included for each inference or determination that is to be made regarding content.

Additionally, it should be noted that the artificial intelligence engines 60A-60D may analyze compressed content (e.g., encoded content) or decompressed content (e.g., content resulting from decoding encoded content). Accordingly, the aggregated result data 64 may reflect determinations that are made based on an encoded version of the content 12 or a decoded version of the content 12.

Individual results from the artificial intelligence engines 60A-60D (e.g., a portion of the aggregated result data 64) may identify different features of the content 12 or determinations related to the content 12. For example, a subset 66 of the aggregated result data 64 may indicate whether content is pirated, how the content 12 was encoded (e.g., which encoding algorithm or software was used, encoding settings used to encode the content 12), or information about the content 12 itself. For instance, subset 66 of the aggregated result data 64 may indicate that the content 12 is a particular movie, television show, or other recorded item of content.

Similar to the artificial intelligence engines 60A-60D, the neural network 62 may be trained to make determinations regarding the content 12. More specifically, the neural network 62 may receive the aggregated result data 64 for many pieces of content and be trained using the aggregated result data 64. Additionally, the neural network 62 may include one or more the artificial intelligence engines that are trained to make determinations (e.g., inferences) about the content 12. For example, the neural network 62 may receive one or more inquiries 68 (e.g., from a user of the content source identification system 10) regarding content (e.g., the content 12), may analyze the aggregated result data 64 (or a portion thereof), and provide reply data 70 based on the analysis of the aggregated result data 64.

As a further example, the neural network 62 may receive several pieces of content and find commonalities between the content. For instance, the neural network 62 may determine whether the pieces of content include the same or similar content (e.g., the same television show, movie, commercials, music), artifacts (e.g., optical artifacts or encoding artifacts), objects, camera signatures, audio signatures, encoders, encoding parameters, or a combination thereof. Additionally, the neural network 62 may analyze transmission characteristics between several pieces of content, such as whether pieces of content are transmitted with the same bit rate(s) (e.g., fixed bit rate and/or variable bit rate).

By comparing content 12, such as content that is the subject of an inquiry 68, the neural network 62 may determine a content source 14 of the content 12 as well as whether the content 12 is pirated. For example, the neural network 62 may compare the content 12 and/or a portion of the aggregate result data 64 associated with the content 12 against other content and/or portions of the aggregate result data 64 associated with other content. The neural network 62 may determine a degree of similarity between pieces of content (e.g., based on whether the pieces of content include possible similarities discussed above). The neural network 62 may output a result (e.g., the reply data 70). The reply data 70 may indicate whether the pieces of content are from the same source, and the reply data 70 may also include a confidence level indicating a degree of certainty of the determination of whether the pieces of content share the same source. For instance, a user may submit an inquiry 68 asking for the content source 14 of one piece of content 12. The artificial intelligence engines 60A-60D may analyze the piece of content 12, generate data for the piece of content 12 that is added to the aggregate result data 64, and the neural network 62 may analyze the aggregate result data 64 to determine whether the piece of content 12 shares the same content source 14 as another piece of content (e.g., a previously analyzed piece of content). The neural network 62 may output reply data 70 indicating that the piece of content 12 shares the same content source 14 as another piece of content. Moreover, if the identity of the content source 14 is known (e.g., a username, IP address, person's name, or another personal or device identifier), the neural network 62 may indicate that a particular person or device is the content source 14 of the piece of content 12.

The neural network 62 may determine a content source based on geography-specific factors or data. For example, the aggregate result data 64 may indicate that content is local or regional content or that that content includes local or regional advertisements. The neural network 62 may determine a geographic area (e.g., cities, counties, states, countries) associated with the particular content. For example, based on analyzing the aggregate result data 64, the neural network 62 may determine that content being analyzed corresponds to a regionally broadcasted sporting event that was originally broadcasted (or is currently being broadcasted) in a region that includes several states. The neural network 62 may also determine that content within the presentation of the sporting event pertains to a more specific locale. For example, the neural network 62 may determine that the content includes an advertisement that was aired (or is airing) in a particular city. In such a case, the neural network 62 may determine that the content source 14 is located within the identified region or the identified city.

To determine whether content is pirated, the neural network 62 may compare encoding settings or features in the aggregate result data 64 of the piece of content 12 against parameter profiles of known pirates (e.g., subsets of the aggregate result data 64 associated with known pirates). For instance, if the neural network 62 determines that the piece of content 12 shares common characteristics with content known to be pirated, the neural network 62 may indicate that the piece of content 12 is pirated in addition to, or independent of, indicating the content source 14 of the piece of content 12.

The neural network 62 may also determine whether content is pirated based on the content not including certain features. For example, content that is the subject of an inquiry 68 may be missing commercials or codes used to indicate that an advertisement or commercial can be added to content (e.g., cue tones described in standard ANSI/SCTE 35 entitled "Digital Program Insertion Cueing Message for Cable") that may have been present in an original or earlier form of the content. The neural network 62 may determine that content being analyzed is pirated based on the content not including commercials, codes used to indicate that an advertisement can be inserted into the content, or both. Furthermore, it should be noted that the neural network 62 may determine whether content is pirated based on a combination of the content being similar to known pirated content and the content not including advertisements or codes used to indicate that advertisements can be added.

As noted above, results from the neural network 62 (e.g., the reply data 70) may include a confidence level of the reply data 70. For example, the neural network 62 may indicate how confident the neural network 62 is regarding a determination the neural network 62 makes. The artificial intelligence engines 60A-60D may also associate confidence levels with results generated by the artificial intelligence engines 60A-60D. For example, if an artificial intelligence engine (e.g., the first artificial intelligence engine 60A) is unsure of a determination or inference, the first artificial intelligence engine 60A may assign a confidence level to data that is included in the aggregate result data 64 that is used to train the neural network 62. Assigning a confidence level to portions of the aggregated result data 64 may affect a confidence level of a determination made by the neural network 62. For example, if the neural network 62 makes a determination based on a portion of the aggregated result data 64 that has a fifty percent confidence level, a confidence level of the determination made by the neural network 62 may be relatively lower than a determination made based on a portion of the aggregated result data 64 that has a higher confidence level.

As another example, a confidence level for a particular determination may be assigned based on the similarity of data to other data. For example, when determining a content source 14 and/or whether content is pirated, the neural network 62 may assign a confidence level to the reply data 70 based on how similar the content 12 is to other content (e.g., content known to be pirated or from a particular content source). The confidence level may be based on a degree of similarity between determined characteristics of the content to characteristics of other content. For example, if the neural network 62 is determining whether content is pirated based on comparing encoding parameters of content to encoding parameters of pirated content, the confidence level may be based on the number of encoding parameters that are shared or similar between the two pieces of content. For instance, if twenty equally-weighted encoding parameters are used, and seventeen of them are determining to be similar, the neural network 62 may indicate that it is eighty-five percent confident that the content is pirated and/or from a particular content source 14. However, it should be noted that the factors being considered by the neural network 62 may not be equally weighted. In other words, the neural network 62 (and/or artificial intelligence engines 60A-60D) may assigned a weight to each factor (e.g., type of data or a particular datum of in the aggregated result data 64), for example, based on the inquiry 68 or particular determination being made.

While the discussion above relates to utilizing the content source identification system 10 for anti-piracy purposes, it should be noted that the content source identification system 10 may also be used for other purposes. For example, the content source identification system 10 may be used to automate archive and library management of media content. More specifically, the content source identification system 10 can recognize content, for example, by using the neural network 62 to analyze the aggregate result data 64 and determine whether content matches other content. The content source identification system 10 may determine what content is (e.g., based on content matching, or being similar to, other known content) without decompressing or decoding the content. Moreover, the content source identification system 10 may determine what particular content is without checking for fingerprints, watermarks, or other identifiers in the content. Rather, the content source identification system 10 would recognize content based on determinations and inferences made by the artificial intelligence engines 60A-60D and the neural network 62.

As another example of the content source identification system 10 being used for archival and library management purposes, a user may submit an inquiry 68 to request content that includes any of the features described above that the content source identification system 10 may use to identify content or a content source 14. For example, a user may submit the inquiry 68 that requests content encoded with a particular program (or version of a program) or in accordance with a particular encoding standard. Additionally, or alternatively, the inquiry 68 may also indicate a request for content that was encoded using a specific set of encoding settings.

Furthermore, the content source identification system 10 may analyze data other than digital content data. That is, the artificial intelligence engines 60A-60D and neural network 62 may analyze types of data in addition to audio data or video data (or metadata associated with audio data or video data). For example, the content 12 may include scripts for television programs, movies, or other forms of video content included in the content 12. Similarly, the metadata 16A, 16B may include metadata related to the scripts. Some of the artificial intelligence engines 60A-60D may be trained to analyze audio data, others may be trained to analyze video data, and other may be trained to analyze scripts. Moreover, some artificial intelligence engines may be trained to analyze more than one of these types of data (e.g., audio data and video data, audio data and scripts, video data and scripts, or audio data, video data, and scripts). In this manner, the content source identification system 10 may be utilized to automatically manage the encoding, scripting, editing, and delivery for a particular piece of content. For example, the content source identification system 10 may associated a particular script with audio and/or video data. The content source identification system 10 may edit the content (i.e., the combination of a script with audio and/or video data) based on editing techniques or practices associated with similar content. Additionally, the content source identification system 10 may be communicatively coupled to broadcasting equipment or to the internet and used to disseminate the content.

Figure 4:
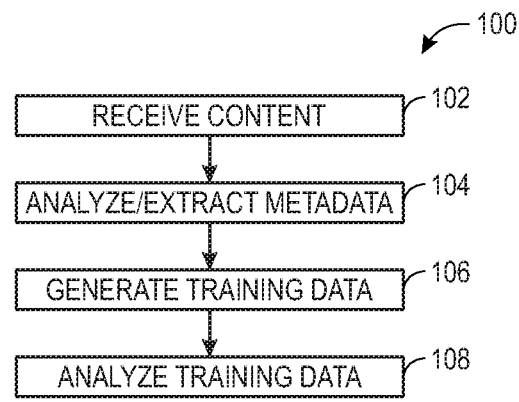
FIG. 4 is a flow diagram of a process for analyzing content, in accordance with an embodiment of the present disclosure.

Continuing with the drawings, FIG. 4 is a flow diagram of a process 100 for analyzing content, such as the content 12. The process 100 may be performed by the processing circuitry 18 by executing the content source identification application 22 stored on the memory/storage 20. In other words, the process 100 may be implemented using the artificial intelligence engines 60A-60D and neural network 62. Additionally, while the process 100 is discussed below as included various operations, in some embodiments, operations may be omitted and/or performed in an order that differs from the order illustrated in FIG. 4.

At process block 102, the processing circuitry 18 may receive content. For instance, as discussed above, the processing circuitry 18 may receive content 12 from the content sources 14. Also, at process block 102, the processing circuitry 18 may receive metadata 16B from the content analyzers 17.

At process block 104, the processing circuitry 18 may analyze and/or extract metadata from the content 12. For example, the processing circuitry 18 may extract metadata 16A that is included in the content 12 as well as analyze the metadata 16A. The processing circuitry 18 may also analyze the metadata 16B that is received from the content analyzers 17. Moreover, in embodiments in which the content source identification system includes the content analyzers 17, at process block 104, the processing circuitry 18 may also generate the metadata 16B before analyzing the metadata 16B.

At process block 106, the processing circuitry 18 may generate training data. As discussed above, the training data may be digital content such as audio data, video data, and image data. The training data may also include other forms of content, such as transcripts. The training data may also include metadata 16A, 16B. At process block 108, the processing circuitry 18 may analyze the training data. For example, artificial intelligence engines implemented using the processing circuitry 18, such as artificial intelligence engines 60A-60D, may be trained using the training data. Additionally, by analyzing the training data, the artificial intelligence engines 60A-60D may generate the aggregated result data 64.

Figure 5:
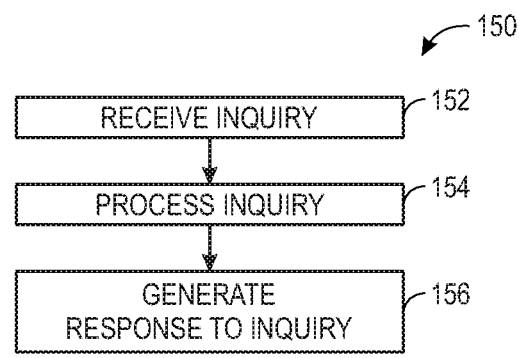
FIG. 5. is a flow diagram of a process for responding to an inquiry, in accordance with an embodiment of the present disclosure.

Before continuing to the discussion of FIG. 5, it should be noted that process blocks 102 and 104 may also be performing by the processing circuitry 18 by implementing the neural network 62. In such a case, the training data may be the aggregated result data 64. Furthermore, as discussed above, the neural network 62 may be trained by analyzing the aggregated result data 64.

FIG. 5 is a flow diagram of a process 150 for responding to an inquiry, such as one of the inquiry 68. The process 150 may be performed by the processing circuitry 18 by executing the content source identification application 22 stored on the memory/storage 20. In other words, the process 150 may be implemented using the artificial intelligence engines 60A-60D and neural network 62. Additionally, while the process 150 is discussed below as included various operations, in some embodiments, operations may be omitted and/or performed in an order that differs from the order illustrated in FIG. 5.

At process block 152, the processing circuitry 18 may receive an inquiry, such as an inquiry 68. The inquiry 68 may be received from an input device (e.g., keyboard, mouse, touchscreen) that is communicatively coupled to the processing circuitry 18 or an electronic device (e.g., computer, tablet, phone, or other electronic device) that is communicatively coupled to the processing circuitry 18. The inquiry 68 may include or indicate particular content (e.g., content 12) to be analyzed. Additionally, the inquiry 68 may indicate what sort of analysis is to be performed. For example, an inquiry 68 may include content and be indicative of a request to determine a content source 14 of the content, whether the content 12 is pirated, or both. As another example, the inquiry 68 may be a request for content such as content stored on the memory/storage 20 that has certain characteristics defined by the request. For instance, the characteristics may pertain to how the content was encoded (e.g., an encoding algorithm and/or encoding parameters) or pertain to the content itself (e.g., a title of the content, a date associated with the content).

At process block 154, the processing circuitry 18 may process the inquiry 68. For example, the processing circuitry 18 may determine content to be analyzed, other content to be compared to the content to be analyzed, and the type of analysis to be performed based on the inquiry. Processing the inquiry at process block 154 may also include analyzing the aggregate result data 64. For instance, in response to an inquiry requesting to determine the source of a particular piece of content, the artificial intelligence engines 60A-60D may analyze the piece of content and generate data that is added to the aggregated result data 64. The neural network 62 may analyze the aggregated result data 64 to determine whether a content source of the piece of content.

At process block 156, the processing circuitry 18 may generate a response to the inquiry. For example, the processing circuitry 18 may generate the reply data 70, which may be displayed via a display that is communicatively coupled to the processing circuitry 18. As noted above, the reply data 70 may include an answer to the inquiry 68, such as an indication of whether the content is pirated, an indication of the source of the content, or both. As another example, the reply data 70 may include content that matches parameters defined by the inquiry 68. For instance, if the inquiry 68 was a request for content having certain encoding parameters, the reply data 70 may include content having those encoding parameters.

Accordingly, the presently disclosed techniques enable content and content sources to be identified, for example, in response to a request for or regarding the content. Additionally, as discussed above, these techniques also enable determinations as to whether content is pirated to be made. As such, the presently disclosed techniques may aid in the identification of illegally obtained and/or illegally distributed content.

In an aspect of this specification, the term "engine" may refer to a software-based system, subsystem, or process configured or programmed to perform one or more functions. The engine may be a component or module that can be executed on a computer or multiple computers at the same or different locations. The engine may be a neural network layer or a series of neural network layers.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A tangible, non-transitory machine-readable medium comprising machine readable instructions that, when executed by processing circuitry, cause the processing circuitry to:
   receive an inquiry regarding digital content encoded by an encoder utilizing encoding parameters, wherein the digital content is generated from original content and different than the original content, wherein the inquiry is indicative of a request to determine a piracy content source of the digital content, wherein the piracy content source corresponds to a person or device that distributes the digital content without authorization;
   process the inquiry to determine the piracy content source by analyzing aggregated result data generated using a series of neural network layers based on the digital content and metadata associated with the digital content, wherein analyzing the aggregated result data comprises:
      comparing the encoding parameters with other encoding parameters used to encode known prior pirated content to identify a subset of known prior pirated content having a threshold match of encoding the encoding parameters; and
      identifying a piracy content source of the subset of known prior pirated content as the piracy content source of the digital content; and
   generate response data to the inquiry using a neural network based on analyzing the aggregated result data, wherein the response data is indicative of the piracy content source of the digital content.

2. The tangible, non-transitory machine-readable medium of claim 1, wherein the encoding parameters comprise a maximum number of frames of the digital content that reference one another, a minimum number of the frames of the digital content that reference one another, one or more settings related to types of the frames of the digital content, frame packing settings, a number of slices per frame of the digital content, a minimum size of slices, a maximum size of slices, quantization parameter settings, an average bitrate of the digital content, a minimum bitrate of the digital content, a maximum bitrate of the digital content, quantization factors between the types of the frames of the digital content, motion estimation settings, or a combination thereof.

3. The tangible, non-transitory machine-readable medium of claim 2, wherein the encoding parameters comprise the average bitrate of the digital content, the minimum bitrate of the digital content, the maximum bitrate of the digital content, or a combination thereof.

4. The tangible, non-transitory machine-readable medium of claim 2, wherein the encoding parameters comprise the motion estimation settings.

5. The tangible, non-transitory machine-readable medium of claim 1, wherein the aggregated result data comprises data generated from processing other digital content and other metadata associated with the other digital content, wherein the other digital content comprises the known prior pirated content.

6. The tangible, non-transitory machine-readable medium of claim 5, wherein the instructions, when executed, are configured to cause the processing circuitry to process the inquiry by comparing a first portion of the aggregated result data associated with the digital content against a second portion of the aggregated result data associated with the other digital content.

7. The tangible, non-transitory machine-readable medium of claim 1, wherein the metadata is indicative of the encoder utilized to encode the digital content and the encoding parameters associated with the digital content.

8. A machine-implemented method comprising:
   receiving, via processing circuitry, an inquiry regarding digital content encoded by an encoder utilizing encoding parameters, wherein the digital content is generated from original content and different than the original content, wherein the inquiry is indicative of a request to determine a piracy content source of the digital content, wherein the piracy content source corresponds to a person or device that distributes the digital content without authorization;
   processing, via a neural network, the inquiry by analyzing aggregated result data generated using a sequence of neural network layers based on the digital content and metadata associated with the digital content, wherein analyzing the aggregated result data comprises:
      comparing the encoding parameters with other encoding parameters used to encode known prior pirated content to identify a subset of known prior pirated content having a threshold match of encoding the encoding parameters; and
      identifying a piracy content source of the subset of known prior pirated content as the piracy content source of the digital content; and
   generating, via the neural network, response data to the inquiry based on analyzing the aggregated result data, wherein the response data is indicative of the piracy content source of the digital content.

9. The method of claim 8, comprising generating, via the sequence of neural network layers, at least a portion of the aggregated result data by implementing one or more artificial intelligence engines configured to receive and analyze the digital content and the metadata, wherein each artificial intelligence engine is configured to receive and analyze a specific data type different from another artificial intelligence engine.

10. The method of claim 8, wherein the inquiry is indicative of the request to:
determine the piracy content source of the digital content; and
determine whether the digital content comprises pirated content.

11. The method of claim 10, wherein the response data comprises a confidence level indicating a degree of certainty of a determination regarding the digital content, wherein the determination comprises the piracy content source of the digital content and an indication of whether the digital content comprises the pirated content.

12. The method of claim 8, wherein the encoding parameters comprise at least two of a maximum number of: frames of the digital content that reference one another, a minimum number of the frames of the digital content that reference one another, one or more settings related to types of the frames of the digital content, frame packing settings, a number of slices per frame of the digital content, a minimum size of slices, a maximum size of slices, quantization parameter settings, an average bitrate of the digital content, a minimum bitrate of the digital content, a maximum bitrate of the digital content, quantization factors between the types of the frames of the digital content, or motion estimation settings.

13. The method of claim 8, comprising:
receiving, via the processing circuitry, training data, wherein the training data comprises other digital media content and other metadata associated with the other digital media content, wherein the other digital media content comprises the known prior pirated content;
analyzing, via the neural network, the training data; and
generating, via the neural network, at least a portion of the aggregated result data by implementing a plurality of artificial intelligence engines configured to receive and analyze the digital content and the metadata.

14. The method of claim 13, wherein the digital content comprises a plurality of data types, wherein each of the plurality of artificial intelligence engines is configured to:
receive one of the plurality of data types and a portion of the metadata associated with the one of the plurality of data types; and
generate a portion of the aggregated result data corresponding to the one of the plurality of data types.

15. The method of claim 14, wherein each of the data types is associated with a different encoding technique.

16. A content source identification system, comprising:
a non-transitory computer-readable storage medium comprising instructions; and
processing circuitry communicatively coupled to the non-transitory computer-readable storage medium and configured to execute the instructions to:
receive an inquiry regarding digital content encoded by an encoder utilizing encoding parameters, wherein the inquiry is indicative of a request for a determination of a first piracy content source of the digital content, wherein the digital content is generated from original content of a second content source and different than the original content, wherein the first piracy content source and the second content source are different;
process the inquiry by analyzing, aggregated result data generated based on the digital content and metadata associated with the digital content, wherein analyzing the aggregated result data comprises:
comparing the encoding parameters with other encoding parameters used to encode known prior pirated content to identify a subset of known prior pirated content having a threshold match of encoding the encoding parameters; and
identifying a piracy content source of the subset of known prior pirated content as the first piracy content source; and
generate response data to the inquiry based on analyzing the aggregated result data, wherein the response data is indicative of the first piracy content source.

17. The content source identification system of claim 16, wherein:
the processing circuitry is configured to generate the aggregated result data using a sequence of neural network layers based on the digital content, the metadata associated with the digital content, other digital content that comprises the known prior pirated content, and other metadata associated with the other digital content; and
the response data is generated using a neural network.

18. The content source identification system of claim 16, wherein the processing circuitry is configured to execute the instructions to:
identify a portion of the digital content; and
determine whether the digital content is missing content or data included in the original content.

19. The content source identification system of claim 18, wherein the content or data included in the original content comprises an advertisement or data indicating that an advertisement or commercial can be added to the original content.

20. The content source identification system of claim 16, wherein the metadata associated with the content comprises metadata included in the content and metadata generated based on an analysis of the content.

* * * * *